Figure 1:
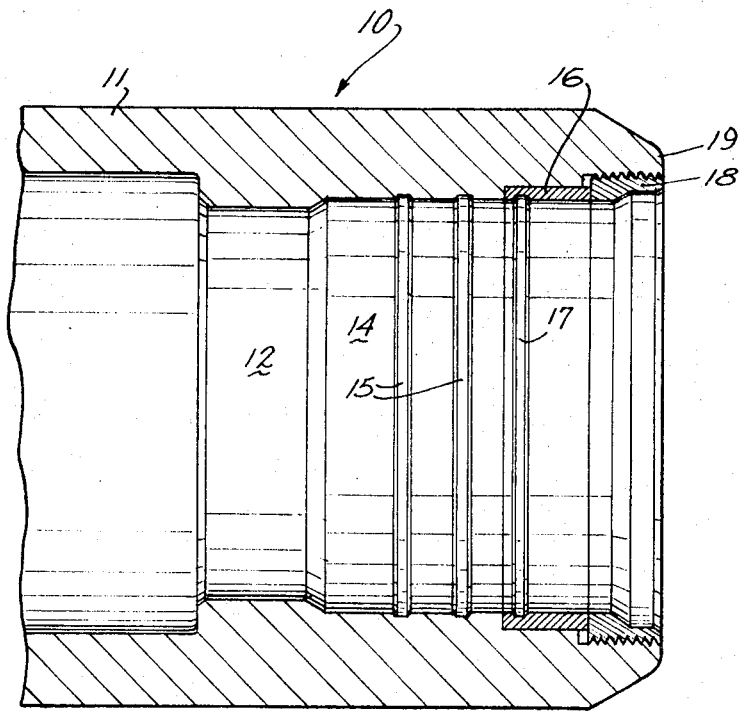

United States Patent

[11] 3,584,903

| [72] | Inventor | James David Pritchard<br>Peterborough, Ontario, Canada |
|---|---|---|
| [21] | Appl. No. | 724,997 |
| [22] | Filed | Apr. 29, 1968 |
| [45] | Patented | June 15, 1971 |
| [73] | Assignee | Atomic Energy of Canada Limited<br>Ottawa, Ontario, Canada |

[54] ROLLED CHANNEL JOINTS
3 Claims, 2 Drawing Figs.

[52] U.S. Cl. ..................................................... 285/382.4,
285/422, 29/523
[51] Int. Cl. ............................................................ F16l 13/14
[50] Field of Search .......................................... 285/382.4,
382.5, 422, 222, 173, 258; 29/523, 507

[56] References Cited
UNITED STATES PATENTS

| 231,501 | 8/1880 | See ............................ | 285/382.5 X |
| 1,589,646 | 6/1926 | Hicks ......................... | 285/222 X |
| 2,171,217 | 8/1939 | Kreidel ....................... | 285/422 X |
| 2,785,459 | 3/1957 | Carpenter ................... | 285/422 X |
| 3,438,655 | 4/1969 | Campbell .................... | 285/382.4 X |

FOREIGN PATENTS

| 1,346,925 | 11/1963 | France ........................ | 285/382.4 |

Primary Examiner—Thomas F. Callaghan
Attorney—Graham & Baker

ABSTRACT: A strong and leak-free hub assembly for use with the pressure tubes of a nuclear reactor is disclosed in which the hub includes a hard insert having at least one groove formed in it, the hardness of the insert being greater than the hardness of the tubular element with which it is joined. Typically, the hub is formed of stainless steel, the insert is formed of surface hardened stainless steel and the tubular element is a zirconium-niobium alloy. The insert has a hardness greater than the hardness of the tubular element.

ROLLED CHANNEL JOINTS

The present invention relates to a new and improved end fitting or hub for the fuel channels of a nuclear reactor.

The fuel channel assemblies locate the fissile material and the coolant in the lattice of the nuclear reactor core, and consist of a thin tubular central element which passes through the core and heavier end hubs which support the assembly. These channels are subject to stress due to temperatures and hydraulic pressures as well as high nuclear radiation, and it is essential that such fuel channels be both strong and leak free. Additionally, the central tubular elements should have desirable nuclear properties such as a low neutron capture cross section to cause a minimum of interference with the nuclear reaction. A material particularly suitable for use in central tubular elements is a Zr-Nb alloy A critical design area in the construction of the fuel channel is the joint between the thin tubular central element and the hub; difficulty has been encountered in providing the required strength and freedom from leakage.

My invention provides a solution to this problem of making a strong and leaktight joint between the thin tubular element and the hub. In accordance with my invention a composite hub is used in which in the region of the joint a high strength material is employed in the area where mechanical strength is required and a lower strength material is provided in the area where the fluid seal is made and mechanical rigidity is required. By this means an inexpensive, strong and leaktight seal is obtained between the hub and the tubular element with the use of a minimum amount of the costly high strength material.

In accordance with my invention, a hub assembly for a fuel channel of a nuclear reactor comprises a hollow cylindrical hub member having a cylindrical inner surface with at least one circumferential groove on the inner surface into which the end of a thin tubular element may be mechanically deformed, and a cylindrical insert in said hub having a surface concentric with said cylindrical inner surface, the surface of said insert having at least one circumferential groove into which said tubular element is mechanically deformed, the insert having a hardness greater than the hardness of the tubular element.

Figure 2:
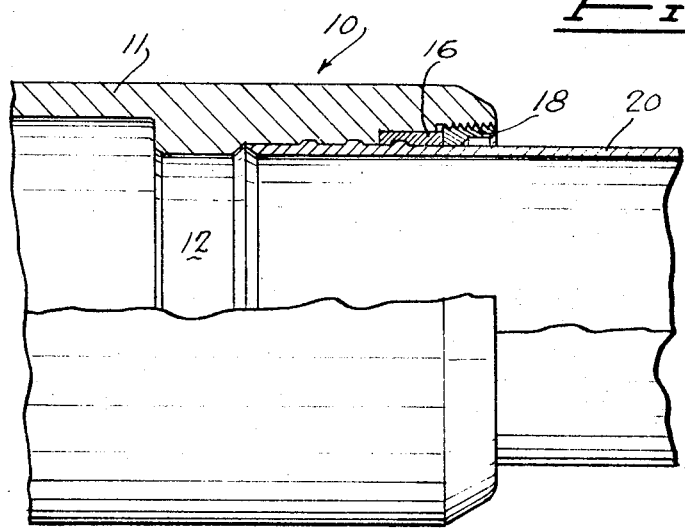

In the accompanying drawings,

FIG. 1 is a section through one end of a hub assembly of the present invention, and FIG. 2 is a perspective, partly in section, illustrating a completed joint between a pressure tube and the hub of FIG. 1.

In FIG. 1 there is shown a hub assembly 10 including a hub member 11. The member 11 is an elongated hollow cylinder having an internal bore 12. A large internal diameter section 14 having circumferential grooves 15 is provided for cooperation with a thin tubular element to form a mechanical joint with the end of the tubular element inserted inside the hub assembly 10. A hub insert 16 having a circumferential groove 17 and an interior surface cylindrical with the portion 14 of the member 11 is held in place by a retaining ring 18 which is mechanically held, such as by threading into the end of the member 11 adjacent the insert 16. The member 11 may, for example, be formed as a machined forging from steel such as type 403 stainless steel or type 410 stainless steel to ASTM specification A276–63 Tp410. The insert 16 preferably is formed of 410 or 403 stainless steel treated to provide a minimum surface hardness of 350 Brinell Hardness Number with 0.2 percent yield tensile strength of 150,000 p.s.i. Such properties of the insert 16 may be obtained by annealing 410 or 403 stainless steel at a temperature of 1,610±25° F. for 3 hours, furnace cooling to 1,100° F. followed by air cooling. The insert 16 is then oil quenched from 1,800±25° F. and then tempered at 650° to 700° F. for 3 hours followed by cooling in air. During assembly, the retaining ring 18 is machined flush with the end 19 of the member 11, and the final machining of the retaining ring 18 may be such as to tighten the ring 18 in the member 11 thereby firmly clamping the insert 16 in the hub.

FIG. 2 illustrates a hub assembly 10 of the present invention fitted to a thin tubular element 20, which may be formed for example of a Zr-Nb alloy. A mechanically strong liquidtight seal is obtained. The thin tubular element 20 is shown mechanically deformed into the grooved portion 14 of the hub 10 and is sealed thereto by rolling so that the material of the tube 20 is extruded into the grooves 15 and 17 of the member 11 and the insert 16. A satisfactory tube rolling process has been developed by the boiler manufacturing industry for connecting boiler tubes to tube sheets. Basically, the process involves the mechanical deformation of the tube to produce a strong fluidtight joint between the tube and the tube sheet. A rolling tool consists of a number of conical shaped rollers running on a tapered central mandrel. The rollers are mounted at a small angle to the centerline of the mandrel so that during the rolling of the joint as the mandrel is rotated it moves forward which causes the rollers to move outwardly. As the rollers move outwardly they force the thin tubular element 20 against the inner surface 14 of the hub and reduce the wall thickness of the tube. This mechanical deformation of the tube results in some of the tube material being deformed into the grooves 15 and 17 in the hub and produces a high residual contact pressure between the tube and the hub. A completed fuel channel for the active lattice of a nuclear reactor consists of a thin tubular element 20 with a hub assembly 10 sealed to each end of the tube 20.

In a typical embodiment of the invention the tube 20 has an inside diameter of 4.070 inches and a wall thickness of 0.090 to 0.100 inches and is formed of a zirconium 2½ percent niobium alloy. The member 11 itself is made of 403 stainless steel which has a 0.2 percent yield strength of about 100,000 p.s.i. at room temperature. The Zr-Nb tubing has a yield strength of 130,000 p.s.i. at room temperature. With this combination of yield strength in the past it has been difficult to achieve a satisfactory joint because the stronger tube material breaks down the corners of the grooves in the weaker hub material. In order to overcome this difficulty the insert 16 of the present invention which is formed of material with a 0.2 percent yield strength of 150,000 p.s.i. is inserted into the hub. The insert 11 includes a joint groove 17 machined on its inner surface.

In order to prove the superiority of the design in accordance with the present invention, two sets of hubs were manufactured, the first (Hub 1) in accordance with FIG. 1 and second set (Hub II) having the same internal configuration as the hub assembly 10 of FIG. 1 but all machined from a single piece of material and not having the insert 16 and the retaining ring 18. These hubs were then joined to identical pieces of Zr-Nb tubing by rolling, with an identical fitting placed on each end of the tube. One end of each tube, designated as end A, was rolled with a 20 percent reduction in the thickness in the tube wall and the other end, designated as end B, was rolled with a 12½ percent reduction in the thickness of the tube wall. Normal practice with roll joints is to roll until there is a 12½ reduction in the tube wall thickness. The 20 percent reduction was utilized in an attempt to deform more material into the groove to achieve higher pull out strength. The groove depth used in these tests was 0.040 inches.

The two assemblies were tested in accordance with the following program:
1. Helium leak test each joint at room temperature.
2. Internally pressurized the assembly to 1,950 p.s.i.g. with gas at room temperature.
3. Helium leak test each joint at room temperature.
4. Thermal cycle the assembly five times from 200° F. to 545° F. in an air atmosphere. On the first cycle hold the assembly at 545° F. for 1 week.
5. Helium leak test each joint at room temperature.
6. Pullout Test:
    a. The assembly not to be pressurized.
    b. One joint heated to 545° F.
    c. Pull the assembly axially until failure occurs. Discontinue pulling when the maximum strength is reached.
    d. Heat the other joint to 545° F.
    e. Pull the assembly axially until failure occurs.

7. Section both joints for visual inspection and photographing.

Tables I and II show the inspection results, calculations and rolling results for both assemblies. The heat treated zirconium 2½ percent niobium tube which was used for the assemblies was taken from a single length of tube. Tensile tests specimens were machined from a sample of the tube. The specimens were tested at 545° F. and the results are recorded in table I.

The hub material for the two assemblies was 403 stainless steel to ASTM A276. The same material with the same properties was used for the two different designs of hubs. The results of the tensile test on a sample of the material are given in table I. The insert rings for the Hub I assembly were taken from the same material but were heat treated to give higher properties as given in table I.

The test results are summarized in table II. The A-joint of Hub II was the only joint to have a leak indication after rolling. The leak was $7.8 \times 10^{17}$ atmos. cc. of air/second and was still rising after testing for 3 hours. This joint was rolled 20 percent whereas the B-joint of Hub II was rolled 12½ percent. It appears that the additional rolling destroyed the leak tightness; however, the pullout strength was increased.

The B-joint of Hub II developed a leak after the assembly was thermal cycled in air. The leak in the A-joint of Hub II increased somewhat and in both cases testing was discontinued before a maximum leak rate indication was attained.

No leak was detected for the joints of Hub I. The instrument is capable of detecting leaks larger than $1 \times 10^{a119}$ atmosphere cc. (air) per second. The results indicate that the high strength insert rings in the hubs of the present invention greatly improve the leak tightness of the joints.

The Hub II joints failed at 84,500 and 77,000 pounds. The A-joint which was rolled 20 percent had the higher pullout strength. The 20 percent A-end of the Hub I assembly failed at 94,800 pounds and the 12½ percent B-end failed at a lower value of 90,600 pounds. The higher strength of the Hub I joints is due to the presence of the high strength insert ring in the hubs. The ultimate tube strength at 545° F. based on the tube cross-sectional area and the tube material ultimate tensile strength is 162,000 pounds. The actual pullout strengths were 47.5 percent and 58.5 percent of this value.

Although neither the Hub I and Hub II joints approached tube strength they were significantly stronger than four times the axial design load which amounts to 44,400 pounds. Hence, from a strength standpoint alone both designs appear to be satisfactory for nuclear reactor use through only the hub of the present invention exhibited satisfactory freedom from leakage.

TABLE I

| Characteristic | Hub II Joint A | Hub II Joint B | Hub I Joint A | Hub I Joint B |
| --- | --- | --- | --- | --- |
| Measurement and calculations: | | | | |
| Hub inside diameter average | 4.385 | 4.385 | 4.385 | 4.386 |
| Hub outside diameter average | 5.996 | 6.000 | 6.500 | 6.500 |
| Tube inside diameter average | 4.077 | 4.077 | 4.077 | 4.078 |
| Tube outside diameter average | 4.374 | 4.374 | 4.373 | 4.373 |
| Hub: | | | | |
| I.D. surface finish | 18–22 | 30–40 | 20 | 15 |
| Groove surface finish | | | | |
| Hardness (Rb) (Units?) | 96 | 96 | 96 | 96 |
| Ultimate tensile strength (p.s.i.) | (1) | (1) | (1) | (1) |
| .2% yield strength (p.s.i.) | (2) | (2) | (2) | (2) |
| Elongation (%) | (3) | (3) | (3) | (3) |
| Ring: | | | | |
| Hardness (Rb) (Units?) | | | 109–111 | 109–111 |
| Ultimate tensile strength (p.s.i.) | | | (4) | (4) |
| .2% Yield Strength (p.s.i.) | | | (5) | (5) |
| Elongation (%) | | | (6) | (6) |
| Tube: | | | | |
| Surface finish | (7) | (7) | (7) | (7) |
| Hardness (Rb) | 103 | 103 | 103 | 103 |
| Ultimate tensile strength | (8) | (8) | (8) | (8) |
| .2% yield strength | (9) | (9) | (9) | (9) |
| Elongation | (10) | (10) | (10) | (10) |
| Tube O.D. average | 4.374 | 4.374 | 4.373 | 4.373 |
| Tube I.D. average | 4.077 | 4.077 | 4.077 | 4.078 |
| Diametral Wall, diff(a) | 0.297 | 0.297 | 0.296 | 0.295 |
| Hub I.D. average | 4.385 | 4.385 | 4.385 | 4.386 |
| Tube O.D. average | 4.374 | 4.374 | 4.373 | 4.373 |
| Joint Clearance diff(b) | .011 | .011 | .012 | .013 |
| Diametral wall reduction 20% and 12½% | .059 | .037 | .059 | .037 |
| Total expansion sum(a) | .070 | .048 | .071 | .050 |
| Tube I.D. average | 4.077 | 4.077 | 4.077 | 4.078 |
| Tube I.D. required after rolling sum(b) | 4.147 | 4.125 | 4.148 | 4.128 |
| Rolling Torque (lb-ft): | | | | |
| Nip-up | 25 | 25 | 15 | 40 |
| 1st roll | 195 | 425 | 480 | 400 |
| 2nd roll | 380 | 200 | 440 | 460 |
| 3rd roll | 350 | | 540 | |
| 4th roll | 280 | | 380 | |
| Final average I.D. | 4.146 | 4.124 | 4.148 | 4.128 |
| Percent achieved-measured | 18.5 | 11.8 | | 12.5 |
| Percent achived-theoretical | 20.4 | 12.8 | 20.0 | 12.5 |
| Hub wall thickness after rolling | .805 | .808 | 1.058 | 1.058 |
| Decrease in hub wall thickness | <.001 | <.001 | <.001 | <.001 |
| Hub O.D. after rolling | 5.998 | 6.002 | 6.502 | 6.502 |
| Increase in hub O.D. | .002 | .002 | .002 | .002 |
| Tube length before rolling | | 14¾ | 14¾ | 15¼ |
| Tube length after rolling | | 15⅜ | 15¼ | 15¹⁵⁄₃₂ |
| Rotation of tube in hub | | 6°15′ | 8°19′ | 5°35′ |

[1] 103,200 at room temperature.
[2] 82,400 at room temperature.
[3] 23% at room temperature.
[4] 180,000 at R/T.
[5] 170,000 at R/T.
[6] 39 to 63 at R/T.
[7] Pickled and autoclaved.
[8] 82,470 at 545° F.
[9] 64,530 at 545° F.
[10] 21% at 545° F.

TABLE II—TEST RESULTS

| Characteristic | Hub II | | Hub I | |
| --- | --- | --- | --- | --- |
| | Joint A | Joint B | Joint A | Joint B |
| He leak test after rolling: | | | | |
| (Atm. c.c. air/sec.) | (¹) | (²) | (²) | (²) |
| Test time, hrs | 3 | 1 | 1 | 1 |
| Proof lead at .950 p.s.i | (³) | (³) | (³) | (³) |
| He leak test after proof: | | | | |
| Load (Atm. c.c. air/sec.) | (⁴) | (²) | (²) | (²) |
| Test time, hrs | 6 | 1 | 1 | 1 |
| 5 thermal cycles in air | (⁵) | (⁵) | (⁵) | (⁵) |
| He leak test after: | | | | |
| Cycles (Atm. c.c. air/sec.) | (⁶) | (⁷) | (²) | (²) |
| Test time, hrs | 2 | 4 | 1 | 1 |
| Tensile test: | | | | |
| Temperature, °F | 545 | 545 | 545 | 545 |
| Strength | 84,500 | 77,000 | 94,800 | 90,600 |
| Joint efficiency, percent | 52 | 47.5 | 58.5 | 56 |
| Cross-section failure mode | (⁸) | (⁸) | (⁸) | (⁸) |

¹ >7.3×10⁻⁷.
² <10⁻⁹.
³ 69° F.—No visible leakage.
⁴ >6.2×10⁻⁷.
⁵ 265 hours at 543° F.
⁶ >2.0×10⁻⁶.
⁷ >1.9×10⁻⁶.
⁸ Rings sheared.

I claim:

1. In combination, a thin tubular element formed of a zirconium-niobium alloy and a hub assembly for making a sealed joint with said thin tubular element, said hub assembly comprising a hollow cylindrical stainless steel hub member, said member having a cylindrical inner surface provided with at least one groove for forming a mechanical joint with the end of said tubular element rolled into said grove, a cylindrical insert formed of surface hardened stainless steel, said insert being in said member and having a surface concentric with said cylindrical inner surface, said surface of said insert having a groove formed therein receiving a rolled portion of the tubular element, said insert having a hardness greater than said tubular element, and means for securing said insert to said hub member.

2. The combination as claimed in claim 5 wherein said insert has a surface hardness of about at least 350 Brinell Hardness number.

3. The combination as claimed in claim 1 wherein said means for securing said insert to said hub member in a retaining ring which is fastened to said hub member.